United States Patent [19]

Oleck et al.

[11] 4,448,677

[45] May 15, 1984

[54] CATALYST AND PROCESS FOR RESIDUA DEMETALATION AND DESULFURIZATION

[75] Inventors: Stephen M. Oleck, Moorestown; Howard S. Sherry, Cherry Hill, both of N.J.

[73] Assignee: Mobil Oil Corporation, New York, N.Y.

[21] Appl. No.: 404,786

[22] Filed: Aug. 3, 1982

Related U.S. Application Data

[63] Continuation of Ser. No. 42,659, May 25, 1979, abandoned, which is a continuation-in-part of Ser. No. 714,145, Aug. 13, 1976, abandoned.

[51] Int. Cl.$^3$ .............................................. C10G 45/04
[52] U.S. Cl. .......................... 208/216 PP; 208/251 H
[58] Field of Search ...................... 208/216 PP, 251 H

[56] References Cited

U.S. PATENT DOCUMENTS

| | | | |
|---|---|---|---|
| 3,770,618 | 11/1973 | Adams et al. | 208/216 PP |
| 4,013,547 | 3/1977 | Mickelson | 208/216 PP |
| 4,051,021 | 9/1977 | Hamner | 208/216 PP |
| 4,066,574 | 1/1978 | Tamm | 252/439 |
| 4,089,774 | 5/1978 | Oleck et al. | 208/89 |
| 4,328,127 | 5/1982 | Angevine et al. | 252/439 |

*Primary Examiner*—Delbert E. Gantz
*Assistant Examiner*—O. Chaudhuri
*Attorney, Agent, or Firm*—Alexander J. McKillop; Michael G. Gilman; Stanislaus Aksman

[57] ABSTRACT

A demetalation and desulfurization catalyst for metal and sulfur containing petroleum oils, e.g., residua containing hydrocarbon components, comprising a hydrogenating component composited on a refractory base, e.g., alumina, having a substantially higher pore volume and more pore volume distributed within the 0–100 Å diameter range than such previously known catalysts and method of using same; said catalyst possesses superior aging characteristics.

7 Claims, 6 Drawing Figures

FIG. 1  DEMETALATION ACTIVITY OF FRESH & AGED CATALYSTS
(NORMALIZED TO 750°F, 0.75 LHSV, 2000 psig)

FIG. 2 DESULFURIZATION ACTIVITY OF FRESH & AGED CATALYSTS (NORMALIZED TO 750°F, 0.75LHSV, 2000psig)

CATALYST AND PROCESS FOR RESIDUA DEMETALATION AND DESULFURIZATION

CROSS-REFERENCE TO RELATED APPLICATIONS

This is a continuation of application Ser. No. 42,659, filed May 25, 1979, now abandoned, which was a continuation-in-part of Ser. No. 714,145 filed Aug. 13, 1976, now abandoned.

BACKGROUND OF THE INVENTION

1. Field of the Invention

This invention is concerned with an improved catalyst and improved catalytic process for the demetalation and desulfurization of petroleum oils, preferably those residual fractions with undesirably high metals and/or sulfur contents. More particularly, the invention utilizes a demetalation-desulfurization catalyst characterized by a novel pore volume and pore size distribution. Additionally, this invention involves catalysts comprising a Group VIB metal and a Group VIII metal composited with an alumina support characterized by a content of gamma phase alumina and a specific pore size distribution.

2. Description of the Prior Art

Residual petroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminants are nickel and vanadium. Iron and small amounts of copper are also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. This is so because the metal contaminants deposit on the special catalysts for these processes and cause the premature aging of the catalyst and/or formation of inordinate amounts of coke, dry gas and hydrogen.

It is a current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800 to 1100° F. temperature and a pressure of one to ten atmospheres. The economic value of the coke by-product is determined by its quality, especially its sulfur and metals content. Excessively high levels of these contaminants makes the coke useful only as low-valued fuel. In contrast, cokes of low metals content, for example up to about 100 ppm (parts-per-million by weight) of nickel and vanadium, and containing less than about 2 weight percent sulfur may be used in high valued metallurgical, electrical, and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800 to 1500° F., a pressure of about 1 to 5 atmospheres, and a space velocity of about 1 to 1000 WHSV.

The amount of metals present in a given hydrocarbon stream is often expressed as a chargestock's "metals factor." This factor is equal to the sum of the metals concentrations, in parts per million of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25 or even 2.5 to 50, may be used to blend with or as all of the feedstock to a catalytic cracker using for instance the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably about 90% need to be removed to produce fractions (having a metals factor of about 2.5 to 50) suitable for cracking chargestocks.

Metals and sulfur contaminants would present similar problems with regard to hydrocracking operations which are typically carried out on chargestocks even lighter than those charged to a cracking unit. Typical hydrocracking reactor conditions consist of a temperature of 400 to 1,000° F. and a pressure of 100 to 3,500 psig.

It is evident that there is considerable need for an efficient method to reduce the metals and/or sulfur content of petroleum oils, and particularly of residual fractions of these oils. While the technology to accomplish this for distillate fractions has been advanced considerably, attempts to apply this technology to residual fractions generally fail due to a very rapid deactivation of the catalyst, presumably by metal contaminants. Therefore, it is also evident there is considerable need for a demetalization/desulfurization catalyst possessing improved aging characteristics.

U.S. Pat. No. 3,770,617 describes a hydrodesulfurization process that employs a catalyst having an oxide or sulfide of a Group VIB and/or Group VIII metal on an alumina support characterized by a specific pore size range; U.S. Pat. No. 3,931,052 describes the demetalation and desulfurization of metal and sulfur containing residual petroleum oils through the use of a catalyst comprising a hydrogenating component composited on an alumina base, whose pores are substantially distributed over a narrow 180 to 300Å diameter range and U.S. Pat. No. 3,383,301 (Beuther et al.) which also deals with demetalation and desulfurization wherein an alumina base catalyst on which is composited a hydrogenating component is utilized. U.S. Pat No. 3,876,523 describes a demetalation/desulfurization catalyst capable of reducing the metals content (Ni+V) by as much as 88% and removing over 95% of the sulfur contaminants. However the performance of this catalyst upon aging leaves something to be desired.

It has now been discovered in accordance with the present invention, that a catalyst which has its pore volume substantially concentrated in certain narrowly defined pore sizes provides a catalyst of overall superior demetalation and desulfurization properties, i.e., such a catalyst provides high demetalation and desulfurization when fresh and when aged.

Some prior art catalysts such as described in U.S. Pat. No. 4,048,060 and U.S. Pat. No. 4,113,636 possess some properties similar to those of the instant catalyst but are devoid of others necessary for superior demetalation and desulfurization activity when fresh and after prolonged use. Especially significant are differences in the pore volume attributed to pores having diameters ranging from 0 to 100 Å.

SUMMARY OF THE INVENTION

It has now been found that hydrocarbon oils containing both metals and sulfur contaminants may be very effectively demetalized and desulfurized by contact, in the presence of hydrogen under hydrotreating conditions, with a catalyst comprising a hydrogenation component, e.g., molybdenum oxide or sulfide and cobalt oxide or sulfide, on a refractory base, e.g., a substantially non-acidic alumina support comprising a gamma phase alumina. The catalyst is further characterized by a particular pore volume and pore size distribution. In particular, the catalyst has at least 50% of its pore volume in pores of 0 to about 100 Å in diameter, with at least 70% of the volume of the pores with a diameter within the range of about 0–150 Å and with at least 90% of its pore volume of 0 to about 200 Å in diameter, with no more than about 10% of its pore volume in pores of greater than 200 Å in diameter and a surface area of at least about 200 m$^2$/g. and having an average total pore volume of approximately 0.80 cc/grams. Additionally, in a preferred variant, at least 25% of the pore volume is in pores of 0 to about 30 Å diameter, and at least 20% of the pore volume is in pores of about 50 to about 100 Å diameter. The catalysts in accordance with this invention provide, under the reaction conditions hereinafter described, high efficiency for both demetalation and desulfurization with unusually slow aging and high catalyst stability.

The catalysts of this invention are prepared by a sequence of procedures, fully described hereinafter, that result in the deposition of hydrogenating material on a gamma phase alumina.

DETAILED DESCRIPTION OF THE INVENTION

The catalysts of the invention are prepared by impregnating hydrogenating components, of Group VIB and Group VIII metals, on a suitable particulate refractory base (in a preferred embodiment, cobalt oxide and molybdenum oxide on a gamma phase alumina); said composite catalyst having not less than 90% of its pore volume in pores having a diameter within the range of from about 0–200 Å, not less than 25% of its pore volume in pores having a diameter within the range of from about 0–30 Å, not less than 50% of its pore volume in pores having a diameter within the range of from about 0–100 Å, and not more than about 10% of its pore volume in pores having a diameter greater than about 200 Å; said catalyst further having a surface area of about 180 to 220 m$^2$/gram, a pore volume between about 0.70 and 0.90 cc/gram and an average pore diameter of about 145 to 170 Å. Catalysts having a surface area of about 204 m$^2$/gram, a pore volume of 0.70–0.90 cc/gram, preferably about 0.80 cc/gram and an average pore diameter of 157 Å have proven especially advantageous. In an especially preferred embodiment the catalyst is further defined as having a hydrogenating component consisting essentially of about 2 to about 10 weight percent, preferably from about 3 to 4 weight percent cobalt oxide or sulfide, and about 5 to about 20 weight percent, preferably from about 9.5 to 11.5 weight percent molybdenum oxide or sulfide.

Not wishing to be bound by specific theories, it is nevertheless felt that the uniqueness of this invention's catalysts is at least partially due to the fact that the alumina catalyst base is calcined at specific temperatures thereby producing a specific alumina phase (gamma) having a pore size distribution distinct from other aluminas.

The gamma phase is normally reached by starting with an alpha phase monohydrate. An alpha phase monohydrate enters the gamma phase at about 500° C., crosses the transition point into the delta phase at about 860° C. and enters the narrowly temperature banded theta phase at about 1060° C. The transition point between theta and alpha phases is about 1150° C. It should be noted, however, that both beta trihydrate and alpha trihydrate aluminas may also be transformed into the alpha monohydrate form. Thus, the initial alumina need not be an alpha monohydrate.

A metal and/or sulfur containing hydrocarbon chargestock is contacted with a catalyst of the class of this invention under a hydrogen pressure of about 500 to 3,000 psig and a hydrogen circulation rate of about 1,000 to 15,000 scf/bbl of feed, and at about 600° F. to 850° F. temperature and 0.1 to 5.0 LHSV. When higher desulfurization is desired the preferred operating conditions are more severe: 725° to 850° F., a hydrogen pressure of 2,000 to 3,000, and a space velocity of 0.10 to 1.5 LHSV.

Figure 1:
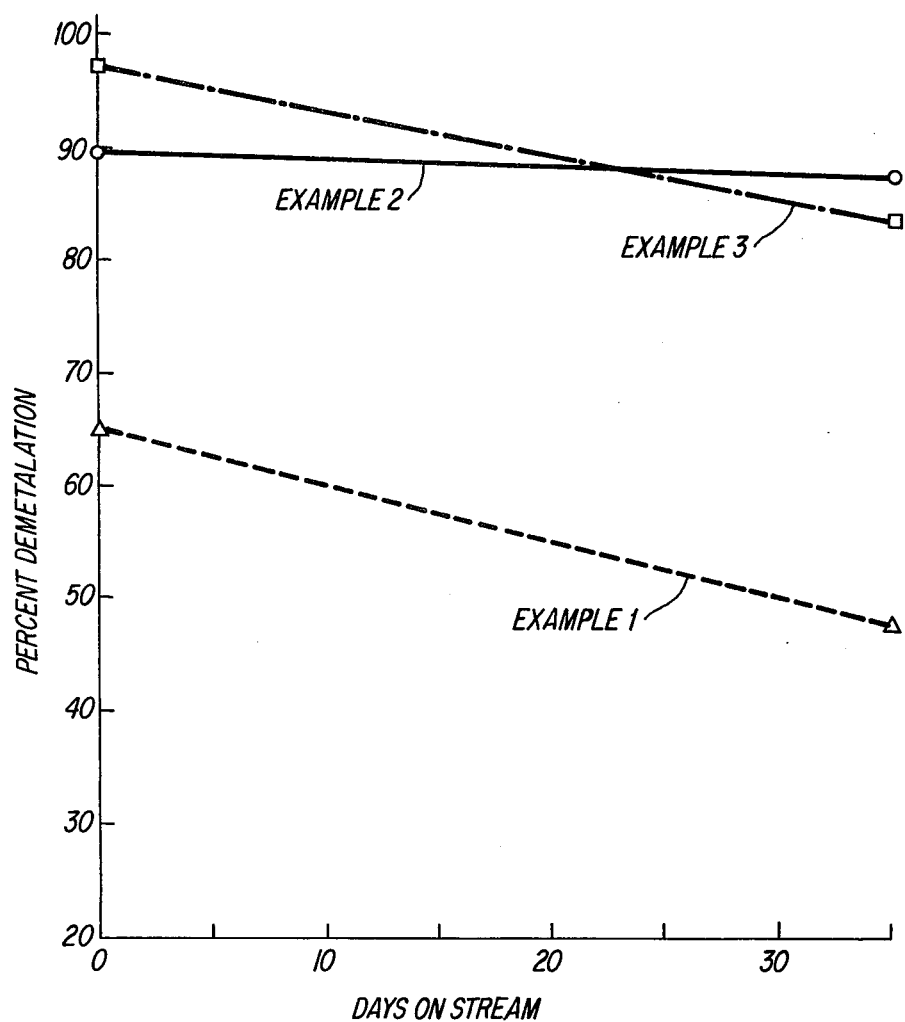
FIG. 1 is a set of activity curves comparing the demetalation activity of a catalyst according to the present invention, a commercial prototype catalyst and a commercially available catalyst which are both outside the scope of this invention.
Figure 2:
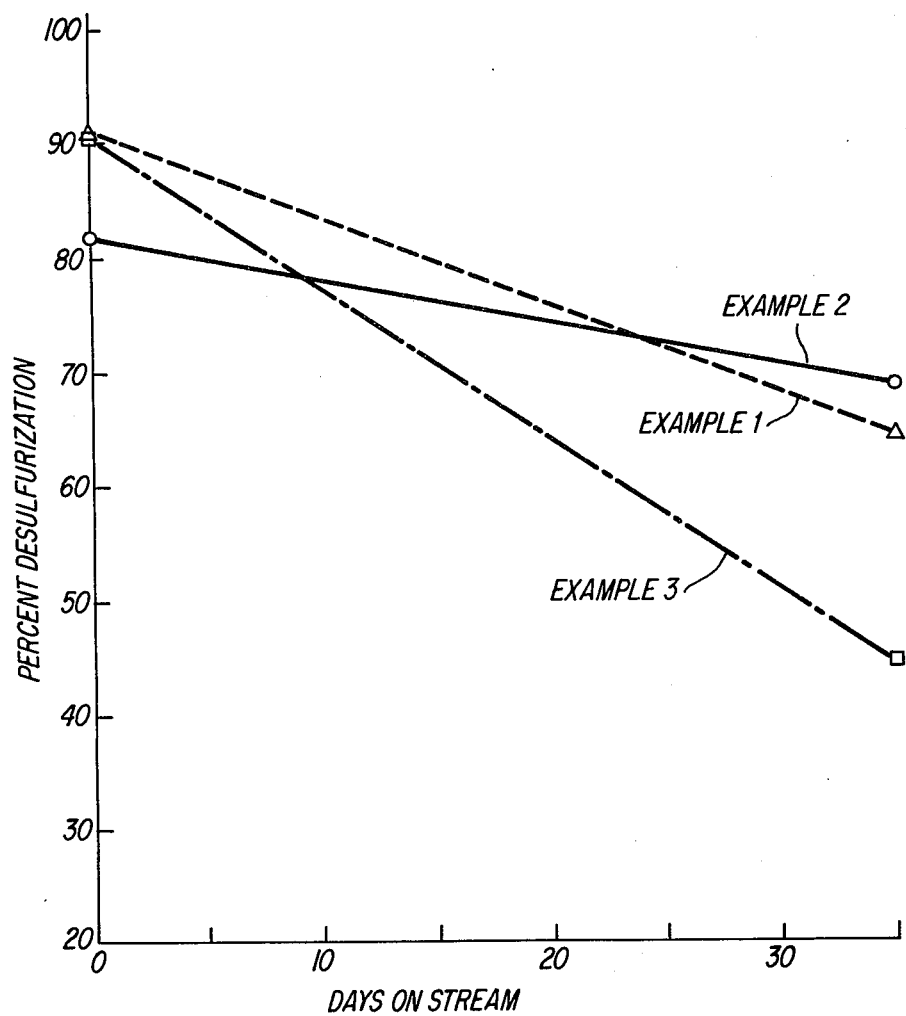
FIG. 2 is a set of activity curves comparing desulfurization activity for a catalyst of the present invention as compared with the above referred to commercial prototype and commercially available catalysts.

As illustrated in FIGS. 1 and 2, a catalyst according to this invention has the ability to dramatically reduce metals content by about 90% and concomitantly remove more than 80% of the sulfur contaminants while maintaining a high degree of catalyst stability. For example, a catalyst in accordance with this invention, (Example 2) although less active than the commercial prototype, (Example 3) lost very little activity (approximately 1.3% for metals removed and approximately 12.9% for sulfur removal) and was much the more active catalyst at the end of 35 days of aging.

The feedstock to be demetalized can be any metal-contaminant containing petroleum stock, but preferably one containing residual fractions. A process in accordance with the previously described operating conditions is especially advantageous in connection with chargestocks having a metal factor of greater than about 25.

Figure 3:
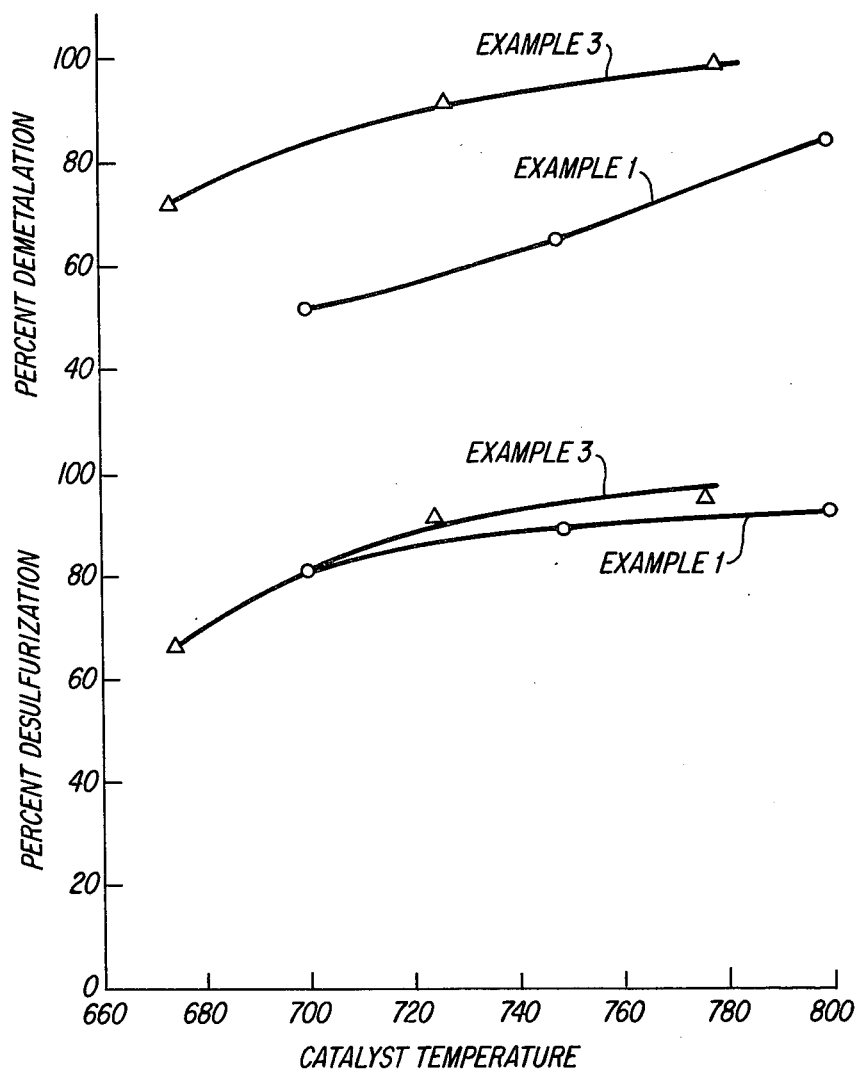
FIG. 3 shows demetalation and desulfurization activity curves as a function of temperature for fresh samples of the above referred to commercial prototype and commercially available catalysts.

FIG. 3 is a direct comparison under identical conditions of a commercially available catalyst (Example 1), said commercial prototype a catalyst in accordance with U.S. Pat. Nos. 3,876,523 and 4,082,695 (see Table 1 "523" patent and below for the properties of said catalyst) identified hereinafter as Example 3 or catalyst 523.

The results in FIG. 3 show said 523 catalyst is capable of reducing metals content (NI+V) by as much as 98% and removing over 95% of the sulfur contaminants. In comparison, the commercial catalyst (Example 1) would require much higher temperatures to reduce the metals and sulfur levels to the same extent as Example 3 (catalyst 523). Obviously 523 is superior for simultaneous demetalation and desulfurization of residua than the commercial catalyst (Example 1).

The operating conditions for the above examples comprised 2000 psig hydrogen pressure, 0.75 LHSV and 5000 SCF H$_2$/bbl of Kuwait atmospheric residuum having 3.54% by weight sulfur, 12 ppm nickel and 42 ppm vanadium.

However, as revealed in aging tests the performance of catalyst 523 leaves something to be desired. Batches of the commercial catalyst and 523 were aged simultaneously at 2000 psig, 0.6 LHSV, 5000 SCF H$_2$/bbl for 95 days with a 50/50 blend of Kuwait/Lagomedio atmospheric residua having 2.85% by weight sulfur, 16 ppm nickel and 110 ppm vanadium. The temperature was 725° F. initially and was gradually raised to 775° F. to maintain about 75% demetalation and desulfurization.

Figure 4:
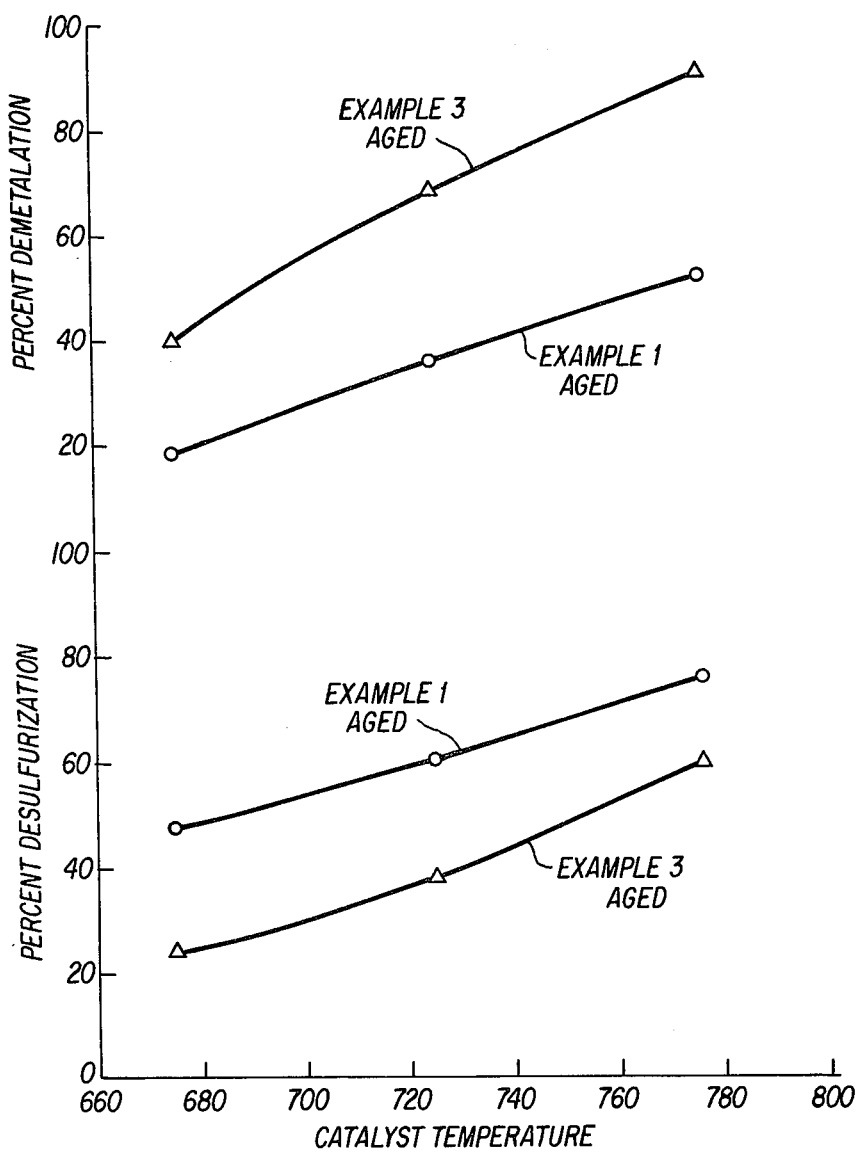
FIG. 4 shows demetalation and desulfurization as a function of temperature for aged samples of the catalysts of FIG. 3.

The aged catalysts were then retested with Kuwait atmospheric residuum having 4.01% by weight sulfur, 11 ppm nickel and 50 ppm vanadium at the same conditions as the unaged catalyst tests. FIG. 4 shows the demetalation and desulfurization activity curves as a function of temperature for both aged catalysts. It shows the superior aging characteristics of catalyst 523 for demetalation. Although the aged 523 still shows substantial desulfurization activity, it is clear that it is less active for desulfurization than the aged commercial catalyst. For example, at 775° F., desulfurization is 61% for catalyst 523 and 76% for Example 1. Thus, it is evident that better retention of desulfurization activity would be a desirable characteristic of a demetalation-desulfurization catalyst.

The concept catalyst of this invention has those characteristics. This is illustrated by the following aging tests. Batches of catalyst 523 and a catalyst in accordance herewith (Example 2) were aged simultaneously at 2000 psig, 0.6 LHSV, 4000 SCF H$_2$/bbl for 35 days with Lagomedio atmospheric residuum containing 2.02% by weight sulfur, 18 ppm nickel and 180 ppm vanadium. The temperature was raised from an initial 725° F. to about 765° F. at end of run to maintain about 75% demetalation and 60–70% desulfurization.

Figure 5:
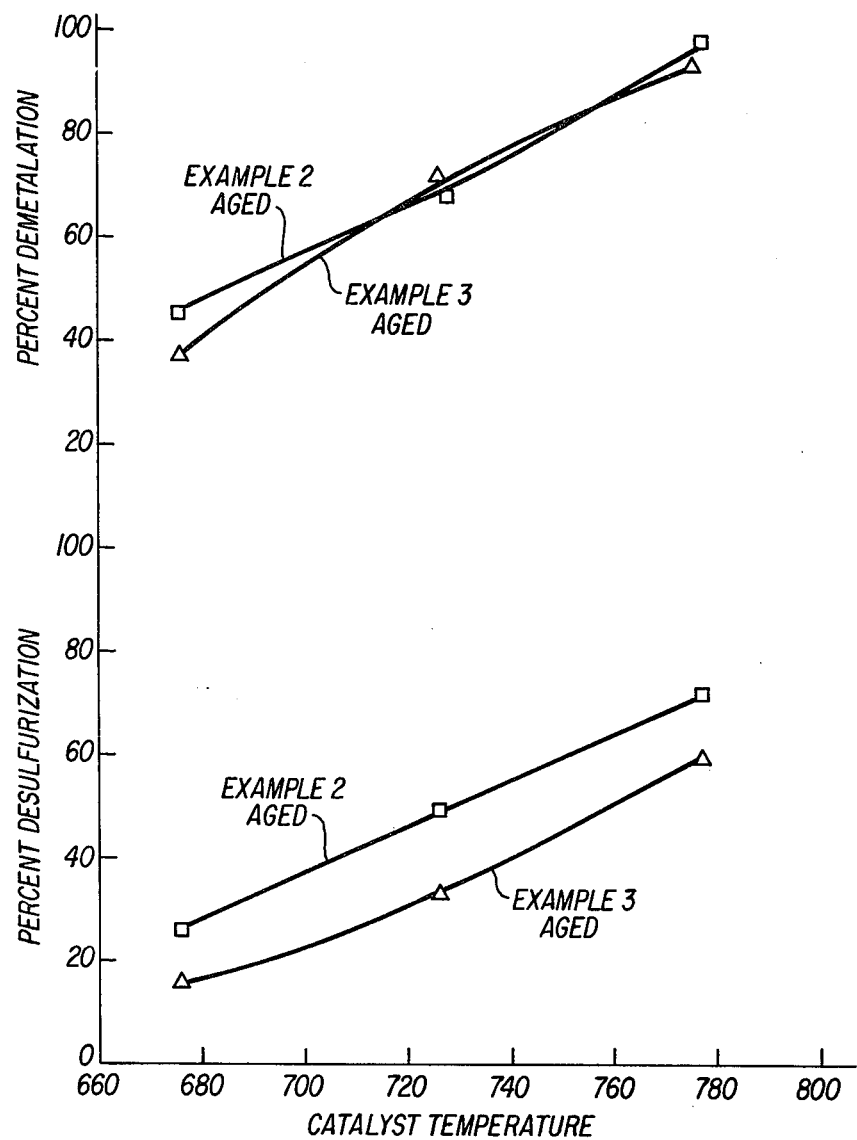
FIG. 5 shows demetalation and desulfurization activity curves as a function of temperature for an aged catalyst according to the present invention and an aged catalyst referred to above as being a commercial prototype.

The aged catalysts were then tested with Kuwait atmospheric residuum having 4.01 by weight sulfur, 11 ppm nickel and 50 ppm vanadium at the same conditions as the earlier activity tests. FIG. 5 shows demetalation and desulfurization activity curves as a function of temperature for the aged catalysts. It shows that a catalyst of this invention is equal to catalyst 523 (Example 3) in demetalation activity and superior to it in desulfurization activity. In fact, examination of the desulfurization results in FIGS. 4 and 5 would indicate that the aged catalyst of this invention has the same superiority in desulfurization activity to the 523 catalyst that the aged commercial catalyst does. Thus, the instant catalysts have the excellent aging characteristics for demetalation that the 523 catalyst has and the desulfurization characteristics that the commercial catalyst (Example 1) has.

Figure 6:
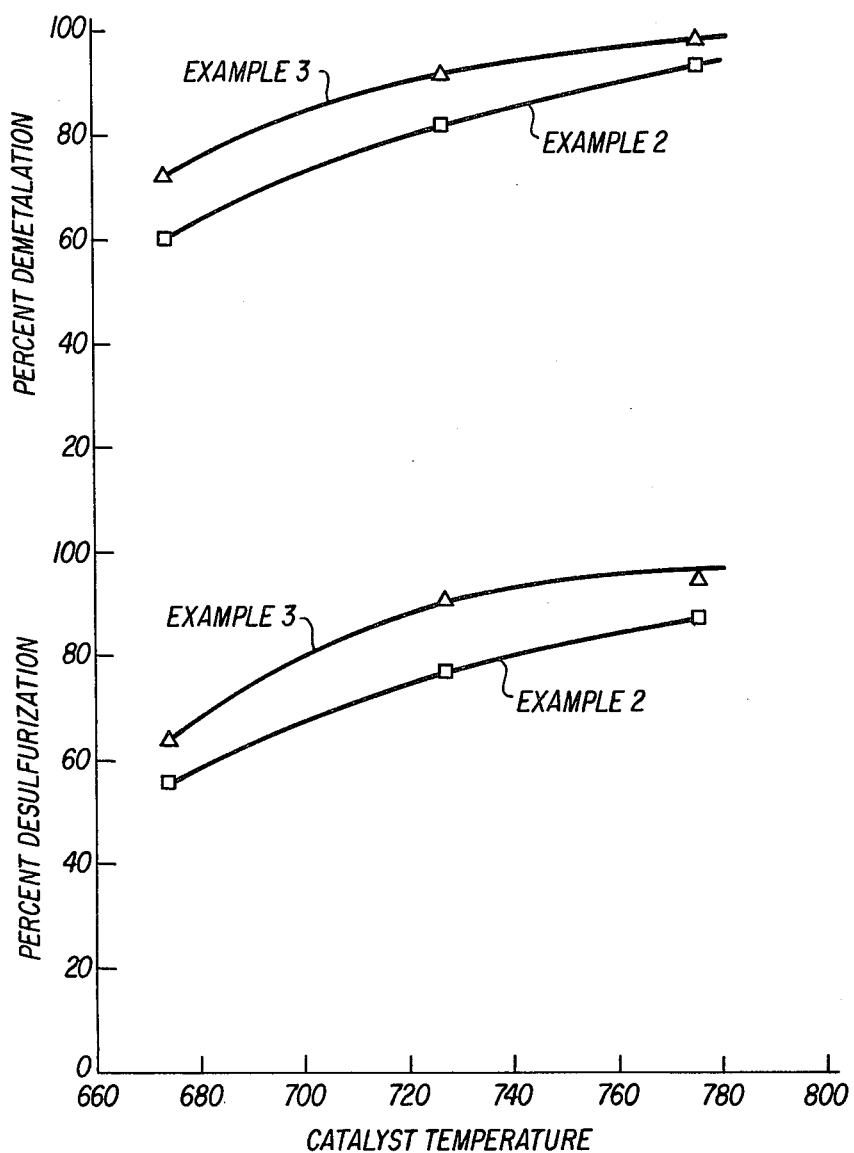
FIG. 6 shows demetalation and desulfurization activity curves for unaged catalysts of FIG. 5.

Actually, the aging characteristics of our catalysts are considerably better than those of 523. They lose less demetalation and less desulfurization activity than is indicated by FIG. 5, because our catalysts are slightly less active in the unaged state. This is shown in the results of FIG. 6, for unaged 523 and an unaged catalyst of this invention (Example 2), for hydrotreating the Kuwait atmospheric residuum described above.

From what has been said, it will be clear that the feedstock can be a whole crude. However, since the high metal and sulfur content of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 900° F. and containing a substantial quantity of asphaltic materials. Thus, a suitable chargestock can be one having an initial or 5 percent boiling point somewhat below 900° F., provided that a substantial proportion, for example, about 40 or 50 percent by volume, of its hydrocarbon components boil above 900° F. A hydrocarbon stock having a 50 percent boiling point of about 900° F. and which contains asphaltic materials, 4% by weight sulfur and 51 ppm nickel and vanadium is illustrative of such chargestock.

The hydrogen gas which is used during the hydrodemetalation-hydrodesulfurization is circulated at a rate between about 1,000 and 15,000 scf/bbl of feed and preferably between about 3,000 and 8,000 scf/bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. Satisfactory removal of hydrogen sulfide from the recycled gas will ordinarily be accomplished by such bleed-off procedures. However, if desired, the recycled gas can be washed with a solvent for hydrogen sulfide or otherwise treated in known manner to reduce the hydrogen sulfide content thereof prior to recycling.

The invention is especially beneficial where the hydrodemetalation-desulfurization is effected without concomitant cracking of the hydrocarbons present in the feedstock. To achieve this result, the temperature and space velocity are selected within the ranges specified earlier that will result in the reduction of the metals content of the feedstock of about 75 to 98%, preferably over 90%.

The hydrogenating component of the class of catalysts disclosed herein can be any material or combination thereof that is effective to hydrogenate and desulfurize the chargestock under the reaction conditions utilized. For example, the hydrogenating component can be a combination of Group VIB and Group VIII metals in a form capable of promoting hydrogenation reactions, especially effective catalysts for the purposes of this invention are those comprising molybdenum oxide and at least one member of the iron group metals. Preferred catalysts of this class are those containing cobalt oxide and molybdenum oxide, but other combinations of iron group metals and molybdenum including iron or nickel, as well as combinations of nickel and tungsten or other Group VIB and Group VIII metals of the Periodic Table taken in combination. The hydrogenating components of the catalysts of this invention can be employed in sulfide or oxide form.

When the use of a catalyst in sulfide form is desired, the catalyst can be presulfided, after calcination, or calcination and reduction, prior to contact with the chargestock or by contact with a sulfiding mixture of hydrogen and hydrogen sulfide, at a temperature in the range of about 400° to 800° F., at atmospheric pressures. Presulfiding can be conveniently effected at the beginning of an onstream period at the same conditions to be employed at the start of such period. The exact proportions of hydrogen and hydrogen sulfide are not critical, and mixtures containing low or high proportions of hydrogen sulfide can be used. Relatively low proportions are preferred for economic reasons. When the unused hydrogen and hydrogen sulfide utilized in the presulfiding operation is recycled through the catalyst bed, any water formed during said presulfiding is preferably removed prior to recycling. It will be understood that elemental sulfur or sulfur compounds, e.g., mercaptans, or carbon disulfide that are capable of yielding hydrogen sulfide at the sulfiding conditions, can be used in lieu of hydrogen sulfide.

Although presulfiding of the catalyst is preferred, it is emphasized that this is not essential as the catalyst will normally become sulfided in a very short time by contact, at the process conditions disclosed herein, with the high sulfur content feedstocks to be used.

For purposes of this invention, it is preferred to operate with catalyst particles such as 1/32" extrudate (1/16" may also be used as circumstances may require) or the equivalent disposed in one or more fixed beds. Furthermore, the catalyst described herein may be effectively used in a dual catalytic system or as the sole catalyst in the process of this invention.

The following examples serve to illustrate the catalyst and process of the invention without limiting same.

In these specific embodiments, Example 1 is a typical commercially available catalyst containing about 3.4% wt. CoO and about 13.4% wt. $MoO_3$ hereinafter described in greater detail. Example 2 is representative of the catalysts of the invention and Example 3 is a commercial prototype catalyst having a different pore volume distribution fully described in U.S. Pat. No. 3,876,533 as SMO 8066. Examples 2 and 3 were prepared by cobalt-molybdenum oxide deposition on alumina as further described below.

EXAMPLE 1

The commercial catalyst identified herein as Example 1 has the following general properties:

| | |
|---|---|
| Packed density | 0.79 g/cc |
| Surface area | 286 m²g |
| Pore volume | 0.491 cc/g |
| Particle density | 1.28 g/cc |
| Real density | 3.42 g/cc |
| Pore diameter | 69 Angstrom units |
| CoO | 3.4% wt. |
| $MoO_3$ | 13.4% wt. |
| $SiO_2$ | 4.91% wt. |
| Ni | 0.18% wt. |

EXAMPLE 2

A preparation procedure for the demetalation-desulfurization catalysts of this invention may be exemplified as follows: 212 grams of an alumina base catalyst (gamma phase) having properties as detailed below, were impregnated with a 168 ml solution containing 30.0 grams of ammonium heptamolybdate (81.9% $MoO_3$).

| Starting material - 1/32" diameter extrudate | | |
|---|---|---|
| Packed density | = | 0.42 g/cc |
| Solution capacity | = | 0.8 cc/g |
| Surface area | = | 209 in²/g |
| Pore volume | = | 0.966 cc/g |
| Particle density | = | 0.81 g/cc |
| Real density | = | 3.72 g/cc |
| Pore diameter | = | 185 Angstrom units |

The impregnated pellets were then dried in an oven at about 250° F. for about 3 hours, the dried product was thereafter impregnated with a 154 ml solution containing 33.3 grams of cobalt nitrate hexahydrate.

The pellets were again dried in an oven at about 250° F. and then calcined in shallow dishes by heating to 1000° F. at a rate of 5° F./min. and holding at about 1000° F. for about 10 hours. Properties of the resulting catalyst were:

| | | |
|---|---|---|
| Packed density | = | 0.51 g/cc |
| Surface area | = | 204 cc²/g |
| Pore volume | = | 0.801 cc/g |
| Particle density | = | 0.94 g/cc |
| Real density | = | 3.71 g/cc |
| Pore diameter | = | 157A |
| CoO | | 3¼% wt. |
| $MoO_3$ | | 10% wt. |

EXAMPLE 3

A preparation procedure for a demetalation-desulfurization catalyst of the commercial prototype i.e., catalyst 523 may be exemplified as follows:

About 525.0 grams of 1/32" extrudate alumina were calcined to a temperature of about 1950° F. thereby transforming the alumina into a particular alumina at about the transition point between delta and theta phases. Water was added to approximately 91.7 grams of ammonium molybdate (about 81.0% MoO₃) until a total volume of about 289.0 ml. was reached. This ammonium molybdate solution-water solution was mixed with the alumina which had been placed under a vacuum for about one half hour, and while still under a vacuum was slightly agitated or rolled for about 5 minutes. The vacuum was removed from the mixture, and 230° F. heat was applied for about 4 hours producing a weight loss due to the drying of about 236.9 grams. Water was added to approximately 69.4 grams of CoCl₂.6H₂O (about 99.0% purity) until a total volume of about 239.0 ml. was reached. This cobalt chloride-water solution was mixed with the molybdenum vacuum impregnated alumina and placed under a vacuum for about one half hour, and while still under a vacuum, was slightly agitated for about 5 minutes. The vacuum was removed from the mixture, and 230° F. heat was applied for about ten hours. Finally, the cobalt-molybdenum impregnated alumina was calcined to about 1000° F. at a gradually increasing rate of approximately 20° F./min., and held at 1000° F. for about ten hours.

The pore volume distribution of the three catalysts was as follows:

| Catalyst | Example 1 | Example 2 | Example 3 |
|---|---|---|---|
| Pore volume, cc/g | 0.491 | 0.80 | 0.4 |
| % of PV in pores of | | | |
| 0-30A diameter | 7 | 29 | 4 |
| 30-50 | 28 | 2 | 3 |
| 50-80 | 61 {97} | 11 {52} | 3 {14} |
| 80-100 | 1 | 10 | 4 |
| 100-150 | 1 | 19 | 30 |
| 150-200 | 0 | 22 | 35 |
| 200-300 | 0 | 4 | 12 |
| >300 | 2 | 3 | 9 |
| Particle size, inches | 1/32 | 1/32 | 1/32 |

The catalysts of Examples 1, 2 and 3 were tested for demetalation and desulfurization activity. The activity tests used Kuwait atmospheric residua (about 3.5–3.9 wt. % sulfur, 51–54 ppm Ni+V) at nominally 675°, 725°, 775° F., 2000 psig, about 0.75 LHSV; the detailed results for Example 2 catalysts are shown in Table 1 and for Example 3 in Table 2. These detailed results were used to normalize activity to 750° F. and 0.75 LHSV. The normalized activity results for the fresh and aged catalyst are summarized briefly as follows:

| | Normalized for 750° F., 0.75 LHSV, 2000 psig | |
|---|---|---|
| Catalysts: | Example 2 | Example 3 |
| Metals (Ni + V) Removal, % | | |
| Fresh Catalyst | 89.3 | 96.6 |
| Aged Catalyst | 88.0 | 83.5 |
| | 1.3 | 13.1 |
| Sulfur Removal, % | | |
| Fresh Catalyst | 81.7 | 90.4 |
| Aged Catalyst | 68.8 | 44.4 |
| | 12.9 | 46.0 | which clearly illustrates the high level of activity and the improved demetalation-desulfurization stability of catalysts of this invention.

The catalysts were aged in Lagomedio residua (described below) and then tested as aged catalysts, in said Kuwait residua. The results demonstrate the improved stability of catalysts in accordance herewith. Venezuelan Lagomedio atmospheric residua was used, having about 2.0–2.5 wt. % sulfur, 195–205 ppm Ni+V to age said catalysts. Hydrotreating conditions were: 2000 psig, 0.5 LHSV, about 3900 SCF/B hydrogen circulation and an average temperature of about 750° F. The catalysts were tested for demetalation and desulfurization activity for a 35 day period. Thereafter the activity was again tested using the Kuwait residua.

FIG. 1 shows a comparison of the demetalation aging rates of Examples 2 and 3 along with the estimated demetalation aging rate of the aforementioned commercial catalyst (Example 1). FIG. 2 is a similar comparison of the desulfurization aging rates of these catalysts and the estimated desulfurization aging rate of said commercially available catalyst. The estimates are based on extensive experience in using this catalyst in the demetalation and desulfurization of residual chargestocks having significant metals and/or sulfur content. FIGS. 1 and 2 thus illustrate the improved catalysts in accordance with this invention.

FIGS. 3 and 4 represent a comparison of fresh and aged activity of Example 1 and Example 3; FIGS. 5 and 6 present a comparison of fresh and aged activity of Examples 2 and 3. A comparison of these figures clearly establishes the overall excellence of catalysts in accordance with this invention and their superior demetalation/desulfurization activity after prolonged use or aging.

Although the preferred embodiments of the invention have been illustrated, it is to be understood that the invention is not limited thereto and may be otherwise variously embodied as one of ordinary skill in the art will readily understand.

TABLE 1
RESULTS OF USING THE CATALYST OF EXAMPLE 2

| Catalyst: | Charge* | | | |
|---|---|---|---|---|
| | Fresh | | | |
| Temperature °F. | | 675 | 727 | 773 |
| Space Velocity LHSV | | .73 | .71 | .71 |
| Hyd. Circ., SCF/B | | 4773 | 4041 | 3940 |
| Hyd. Consump., SCF/B | | 310 | 470 | 612 |
| Sulfur, % Wt. | 3.56 | 1.77 | .88 | .47 |
| % Desulfurization | | 56.8 | 78.8 | 88.8 |
| Nickel ppm | 12 | 6.8 | 3.0 | 1.5 |
| Vanadium ppm | 38 | 17 | 7.1 | 2.1 |
| % Demetalation | | 53 | 80 | 93 |
| Mol Wt. | | 468 | 470 | 410 |
| Hydrogen % Wt. | 11.78 | 12.02 | 12.28 | 12.44 |
| API Gravity Measurement | 18.8 | 21.2 | 23.6 | 26.9 |
| Nitrogen % Wt. | .19 | .18 | .15 | .099 |
| | AFTER 35 DAYS AGING | | | |
| Temperature °F. | | 676 | 726 | 777 |
| Space Velocity LHSV | | .65 | .89 | .69 |
| Hyd. Circ., SCF/B | | 4971 | | |
| Hyd. Consump., SCF/B | | 95 | 202 | 103 |
| Sulfur, % Wt. | 4.01 | 2.88 | 2.23 | .98 |
| % Desulfurization | | 29.1 | 45.7 | 76.6 |
| Nickel ppm | 11 | 8.7 | 6.9 | 1.0 |
| Vanadium ppm | 50 | 23 | 14 | .9 |
| % Demetalation | | 48 | 66 | 97 |
| Mol Wt. | 494 | 473 | 447 | 409 |
| Hydrogen % Wt. | 11.45 | 11.64 | 11.79 | 12.21 |
| API Gravity Measurement | 16.7 | 19.3 | 20.9 | 25.4 |

TABLE 1-continued
RESULTS OF USING THE CATALYST OF EXAMPLE 2

| Catalyst: | Charge* | | | |
|---|---|---|---|---|
| Nitrogen % Wt. | .21 | .20 | .18 | .14 |

*Kuwait Atmospheric Residua

TABLE 2
RESULTS OF USING THE CATALYST OF EXAMPLE 3

| Catalyst: | Charge* | | | |
|---|---|---|---|---|
| | Fresh | | | |
| Temperature °F. | | 674 | 727 | 776 |
| Space Velocity LHSV | | .73 | .79 | .73 |
| Hyd. Circ., SCF/B | | 5360 | 3140 | 3950 |
| Hyd. Consump., SCF/B | | 380 | 500 | 840 |
| Sulfur, % | 3.56 | 1.23 | .65 | .16 |
| % Desulfurization | | 66.1 | 82.2 | 95.6 |
| Nickel ppm | 12 | 4.5 | 1.7 | .3 |
| Vanadium ppm | 38 | 9.4 | 2.7 | .2 |
| % Demetalation | | 72.1 | 91.3 | 99.0 |
| Hydrogen % Wt. | 11.78 | 12.16 | 12.36 | 12.86 |
| API° Gravity Measurement | 18.8 | 22.9 | 25.3 | 28.7 |
| Nitrogen % Wt. | .19 | .16 | .13 | .07 |
| AFTER 35 DAYS AGING | | | | |
| Temperature °F. | | 676 | 725 | 775 |
| Space Velocity LHSV | | .72 | .70 | .72 |
| Hyd. Circ., SCF/B | | 4733 | 4348 | 4001 |
| Hyd. Consump., SCF/B | | 104 | 208 | 367 |
| Sulfur, % Wt. | 4.01 | 3.42 | 2.69 | 1.62 |
| % Desulfurization | | 15.4 | 34.2 | 60.9 |
| Nickel ppm | 11 | 9.8 | 5.5 | 1.9 |
| Vanadium ppm | 50 | 28 | 11 | 2.2 |
| % Demetalation | | 38 | 73 | 93 |
| Mol Wt. | 494 | 477 | 449 | 264 |
| Hydrogen % Wt. | 11.45 | 11.62 | 11.78 | 12.03 |
| API° Gravity Measurement | 16.7 | 19.9 | 20.9 | 24.0 |
| Nitrogen % Wt. | .21 | .20 | .19 | .16 |

*Kuwait Atmospheric Residua

What is claimed is:

1. A process for treating a residual hydrocarbon oil to reduce the metal or sulfur content thereof which comprises contacting said oil with hydrogen at a hydrogen pressure of about 500 to 3000 psig, a hydrogen circulation rate of about 1000 to 15,000 scf/bbl. of feed, a temperature of about 600 to 850° F., a space velocity of 0.1 to 5.0 LHSV; and in the presence of a catalyst comprising a hydrogenating component which comprises the oxides or sulfides of a Group VI-B metal and a Group VIII metal on an alumina support comprising gamma phase alumina, said catalyst having at least 25% of its pore volume in pores of 0–30 Å diameter, at least 50% of its pore volume in pores of 0–100Å diameter, at least 90% of its pore volume in pores 0–200 Å diameter, and not more than 10% of its pore volume in pores greater than 200 Å diameter.

2. The process of claim 1 wherein the hydrogenating component of said catalyst consists essentially of about 2 to about 10 weight percent cobalt oxide and about 5 to about 20 weight percent molybdenum oxide.

3. The process of claim 1 wherein said catalyst has a pore volume of at least 0.80 cc/gram and a surface area of at least 204 m²/gram.

4. The process of claim 1 wherein the hydrogenating component consists of sulfides of cobalt and molybdenum.

5. The process of claim 1 wherein the hydrogenating component of said catalyst consists essentially of about 2 to about 10 weight percent nickel oxide and about 5 to about 20 weight percent molybdenum oxide.

6. The process of claim 1 wherein the hydrogenating component consists of sulfides of nickel and molybdenum.

7. The process of claim 1 wherein the catalyst pore volume distribution is further defined as follows: at least 25% of the volume of pores with a diameter within the range of about 0 to about 30 Å, at least 70% of the volume of the pores with a diameter within the range of about 0 to about 150 Å, at least 90% of the volume of the pores with a diameter within the range of about 0 to about 200 Å and no more than about 10% of the volume of the pores with a diameter greater than about 200 Å.

* * * * *

UNITED STATES PATENT AND TRADEMARK OFFICE
CERTIFICATE OF CORRECTION

PATENT NO. : 4,448,677
DATED : May 15, 1984
INVENTOR(S) : S.M. OLECK and H.S. SHERRY It is certified that error appears in the above-identified patent and that said Letters Patent are hereby corrected as shown below:

Column 3, Line 6: "U.S. Patent..." should be a new paragraph.

Column 3, Line 43: After "volume" insert --in pores--.

Column 6, Line 26: After "have the" insert --same--.

Column 7, Line 38: After "atmospheric" insert --or elevated--.

Column 9, Line 26: "20°" should be "2°".

Signed and Sealed this

Second Day of October 1984

[SEAL]

Attest:

Attesting Officer

GERALD J. MOSSINGHOFF

Commissioner of Patents and Trademarks